United States Patent
Collinge et al.

[11] Patent Number: 6,132,785
[45] Date of Patent: Oct. 17, 2000

[54] PROCESS FOR PREPARING BATTER COATED FRENCH FRIED POTATO STRIPS

[75] Inventors: Susan F. Collinge, Boise; Michael L. Hamann; Ronald J. Plaisted, both of Caldwell, all of Id.

[73] Assignee: J. R. Simplot Company, Boise, Id.

[21] Appl. No.: 09/182,618

[22] Filed: Oct. 29, 1998

[51] Int. Cl.[7] .................................................. A23L 1/217
[52] U.S. Cl. .................... 426/302; 426/102; 426/441; 426/637
[58] Field of Search .................................. 426/438, 441, 426/302, 637, 102

[56] References Cited

U.S. PATENT DOCUMENTS

| | | |
|---|---|---|
| 3,175,914 | 3/1965 | Vahlsing . |
| 3,574,638 | 4/1971 | Nagel et al. . |
| 3,597,227 | 8/1971 | Murray et al. . |
| 3,650,776 | 3/1972 | Tschirgi . |
| 3,676,158 | 7/1972 | Fischer et al. . |
| 3,751,268 | 8/1973 | Van Patten et al. . |
| 3,956,515 | 5/1976 | Moore et al. ............... 426/302 |
| 4,272,553 | 6/1981 | Bengtsson et al. ........... 426/241 |
| 4,317,842 | 3/1982 | El-Hag et al. ............... 426/302 |
| 4,487,786 | 12/1984 | Junge ........................ 426/302 |
| 4,504,509 | 3/1985 | Bell et al. .................. 426/549 |
| 4,542,030 | 9/1985 | Haury et al. ................ 426/262 |
| 4,590,080 | 5/1986 | Pinegar ...................... 426/441 |
| 4,632,838 | 12/1986 | Doenges ..................... 426/441 |
| 4,900,576 | 2/1990 | Bonnett et al. ............ 426/637 X |
| 4,931,296 | 6/1990 | Shanbhag et al. ............ 426/243 |
| 4,970,984 | 11/1990 | Pirrotta et al. ............. 426/289 |
| 5,015,484 | 5/1991 | Palmlin et al. .............. 426/92 |
| 5,059,435 | 10/1991 | Sloan et al. ................ 426/102 |
| 5,141,759 | 8/1992 | Sloan et al. ................ 426/102 |
| 5,279,840 | 1/1994 | Baisier et al. .............. 426/102 |
| 5,328,704 | 7/1994 | Ritch ....................... 426/102 |
| 5,622,741 | 4/1997 | Stubbs et al. ............... 426/243 |
| 5,648,110 | 7/1997 | Wu et al. ................... 426/102 |
| 5,750,168 | 5/1998 | Woerman et al. ............. 426/102 |

FOREIGN PATENT DOCUMENTS

| | | |
|---|---|---|
| 0026565 | 8/1980 | European Pat. Off. . |
| WO8501188 | 3/1985 | WIPO . |
| WO8806007 | 8/1988 | WIPO . |
| WO9742827 | 11/1997 | WIPO . |

*Primary Examiner*—Arthur L. Corbin
*Attorney, Agent, or Firm*—Kelly Bauersfeld Lowry & Kelley, LLP

[57] ABSTRACT

Improved batter coated French fried potato strips and a related preparation process are provided, wherein the potato strips are suitable for fast finish preparation in an oven and exhibit overall taste, appearance and textural characteristics closely emulating frozen parfried potato strips which have been finish prepared by frying. The preparation process comprises cutting and blanching fresh potato strips, and then coating the strips with an aqueous starch slurry. The batter coated potato strips are then subjected to a first parfry step after which the strips are promptly frozen. The once-parfried and frozen potato strips are next subjected to a second parfry step followed by freezing a second time and packaging for storage and/or shipment. The thus-prepared potato strips can be finish cooked in an oven for consumption, with a short preparation time and with quality characteristics similar to French fried potato strips which have been finish prepared by frying.

26 Claims, No Drawings

PROCESS FOR PREPARING BATTER COATED FRENCH FRIED POTATO STRIPS

BACKGROUND OF THE INVENTION

This invention relates generally to processes for preparing parfried and frozen potato strips such as French fries. More specifically, this invention relates to an improved process for preparing batter coated potato strips adapted for reconstitution or finish preparation in an oven, with a fast finish preparation time together with a highly desirable combination of taste, appearance and textural characteristics closely matching the characteristics of frozen parfried potato strips which have been finish prepared by frying.

Parfried and frozen potato strips, commonly referred to as French fries, are widely available in the foods industry. These potato products are conventionally prepared by cutting whole potatoes into elongated strips of a desired size and shape, and then partially cooking the potato strips by blanching in water or steam. Thereafter, the potato strips are partially fried, or parfried, in hot cooking oil, followed by freezing for packaging, shipping and/or storage. Prior to consumption, the parfried and frozen potato strips are reconstituted or finish prepared typically by finish frying in hot oil. French fried potato strips of this type are utilized extensively in restaurant and food service operations, and particularly in so-called fast food restaurants wherein it is desirable to produce a finish cooked product with a substantially optimized set of quality characteristics and with a finish fry preparation time that is as short or fast as possible.

More specifically, one major objective of potato processors is to provide parfried and frozen potato strips which can be finish prepared with a combination of taste, color, odor, and textural attributes selected for optimum consumer palatibility. For example, it is highly desirable to provide parfried and frozen potato strips which, after reconstitution, exhibit a light and tender but crispy exterior surface encasing a soft and mealy interior which is neither too dry nor too soggy. Moreover, especially in a fast food restaurant environment, it is important to provide finish cooked potato strips which can consistently retain these desired sensory qualities for an extended holding period of at least several minutes before actual consumption. In the past, achieving these desirable product qualities on a consistent basis has generally required that the potato strips be finish prepared by frying in hot oil. In a fast food establishment, to avoid advance preparation of potato strips that might not be sold or served within a limited holding time of several minutes, a rapid finish fry step is desired and is typically on the order of about 1–3.25 minutes for smaller so-called shoestring size cut strips and about 3–4 minutes for larger strips cut sizes.

In recent years, alternative finish preparation methods have been researched in an attempt to eliminate the need to finish fry potato strips at the restaurant or food service facility. In this regard, traditional finish fry preparation methods have required specialized or dedicated frying equipment which can be difficult to maintain in a clean and sanitary condition. Moreover, finish frying steps inherently requiring the facility to use and handle significant amounts of cooking oil, with its associated cost and increasingly complex issues of used oil disposal. Further, there is an increased demand among health conscious consumers for food products having a reduced oil or fat content, whereby there is a growing demand for potato strips which are not finish prepared by frying. While these factors all contribute to an increasing interest in potato strips which have been finish prepared by means other than frying, the final product served to the consumer must exhibit a substantially optimized set of taste, appearance and textural characteristics similar to a finish fried product in order to achieve consumer acceptance.

Moreover, in recent years, batter coatings in the form of a water-based starch slurry have been proposed in French fry potato strip preparation processes, wherein the potato strips are dipped into or sprayed with the coating before parfrying and freezing. See, for example, U.S. Pat. Nos. 5,059,435; 5,141,759; and 5,648,110. The batter-coated potato strips are subsequently finish prepared normally by finish frying in hot oil, to produce potato strips having enhanced external crispiness and exhibiting somewhat extended product holding times prior to consumption. Attempts to finish prepare such batter-coated products by other methods, particularly such as by oven heating with a fast cycle time comparable to finish frying, have resulted in potato strips which are unacceptably limp and soggy, and which do not exhibit a satisfactory post-preparation holding time. Accordingly, batter coated French fry potato strips for finish preparation by oven heating have not achieved any significant degree of commercial acceptance.

The present invention relates specifically to an improved product and related process for preparing batter coated French fry potato strips which are suitable for fast finish preparation by oven heating, with a cycle time comparable to finish fry preparation, wherein the finish prepared potato strips exhibit a combination of taste, appearance and texture characteristics similar to batter coated potato strips which have been finish fried.

SUMMARY OF THE INVENTION

In accordance with the invention, an improved process and related batter coated French fry potato strip product are provided, wherein the potato strips are capable of rapid finish preparation in an oven with a combination of highly desirable taste, appearance and texture characteristics emulating batter coated potato strips which have been finish prepared by frying.

The improved process of the present invention comprises initial partial cooking of fresh cut potato strips by blanching in water or steam, followed by partial drying by removal of excess water therefrom. The potato strips are enrobed or encased within a starch based batter applied by dipping or spraying, after which the strips are subjected to a first parfry step in hot oil, followed promptly by a first freeze step. The once-parfried and frozen strips are then subjected while frozen to a second parfry step, after which the strips are frozen a second time. The twice-parfried and frozen batter coated potato strips are packaged for appropriate storage and/or shipment.

The twice-parfried and twice-frozen batter coated strips are suitable for finish preparation by oven heating. More specifically, these potato strips can be finish prepared in an air impingement oven with a rapid finish preparation time comparable to traditional finish preparation times by finish frying, i.e., less than about 4 minutes and preferably on the order of about 2–2½ minutes. The resultant potato strips exhibit a combination of desirable taste, appearance and texture characteristics similar to French fry potato strips which have been finish prepared by frying. Moreover, the potato strips in accordance with the present invention, and finish prepared by oven heating, exhibit an extended post-preparation holding time comparable to French fry potato strips which have been finish fried.

Other advantages and features of the present invention will become more apparent from the following detailed description.

DETAILED DESCRIPTION OF THE PREFERRED EMBODIMENT

The present invention relates to an improved batter coated parfried and frozen potato strip product and related preparation process, wherein the batter coated potato strips are adapted for rapid finish preparation or reconstitution in an oven for serving and consumption. The reconstituted potato strips exhibit a highly desirable overall combination of taste, appearance and textural characteristics which closely emulate the characteristics of parfried and frozen potato strips which have been finish prepared by frying.

More specifically, parfried and frozen potato strips, commonly known as French fries, are used extensively by restaurants and food service operations, wherein the frozen potato strips are adapted for relatively fast finish preparation or reconstitution by finish frying in hot oil immediately prior to serving the potato strips for consumption. French fried potato strips prepared in this manner possess a combination of flavor, appearance and texture characteristics which have become recognized by consumers as indicative of a quality product. In particular, this combination of desirable characteristics includes a soft and mealy strip interior with a strong potato flavor, encased within an outer surface which is light, tender, and relatively crisp with a golden brown color. Such potato strips, when finish prepared at the restaurant or food service facility, will substantially retain these desirable traits for at least several minutes following finish fry preparation and prior to actual serving of the potato strips to a consumer. Moreover, especially in a fast food restaurant environment, potato strips exhibiting these desirable qualities can be finish fried in a short preparation time, typically on the order of 2-3 minutes to avoid the need to prepare significant product quantities in advance, with an inherent requirement for the product to undergo a longer post-preparation holding time before serving.

The present invention provides a parfried and frozen potato strip product, and related preparation process, wherein the potato strips can be finished prepared on a rapid basis consistent with the demands of a fast food restaurant. However, the present invention permits the product strips to be finish prepared in an oven, yet exhibit a combination of quality characteristics closely matching those associated with products strips which have been finish fried, as described above. Accordingly, the improved product and process of the present invention enables the food service operator to eliminate use of hot oil frying equipment and the related problems and expenses associated with cooking oil and the handling and disposal thereof. Alternately, the present invention allows the food service operator to utilize existing hot oil frying equipment for other food products in an expanded menu offering. Importantly, oven finishing of the potato strips in accordance with the present invention does not adversely impact the quality of the product served to the customer, and further does not negatively affect the rate at which those potato strips can be reconstituted for serving.

In one preferred and exemplary form of the invention, elongated so-called shoestring potato strips are cut to a desired size and shape from raw whole peeled and trimmed potatoes, such as Russet Burbank, Shepody, or other potato varieties used commonly in the production of parfried and frozen French fry potato strips. Specifically, these potatoes are cut into strips of generally square cross sectional shape with the width of each cut strip side on the order of about 0.29-0.30 inch. The lengths of the cut potato strips vary according to the size of the potatoes being cut, with a typical length ranging from about one inch to about 6 inches. The cut strips prepared as described desirably have a length distribution of at least about 30% having a length exceeding three inches, and not more than about 20% having a length less than two inches.

These shoestring potato strips are partially cooked by water blanching in hot water or steam, such as blanching at approximately 155–200° F. for about 2–15 minutes. In a water blanching step, dextrose and/or sodium acid pyrophosphate (SAPP) may be present in minor amounts for improved browning and color control during subsequent processing. Alternately, after blanching, the strips may be dipped in water containing these constituents. The blanched potato strips are then drained of excess water and/or partially dried in any suitable manner, such as by exposure to heated or warm ambient air for a sufficient time to achieve a strip weight loss on the order of about 15%.

Thereafter, the potato strips are encased or enrobed within a starch based batter applied by dipping or spraying. This batter comprises a so-called clear-coat batter in the form of an aqueous starch slurry, such as a starch slurry according to U.S. Pat. Nos. 5,059,435; 5,141,759; and 5,648,110, which are incorporated by reference herein. One preferred starch based batter used in Examples 1-6 as described below is set forth in the following Table 1:

TABLE 1

| BATTER #1 | % of Dry Mix |
| --- | --- |
| Potato Starch (PenBind 190) | 50.35 |
| Corn Starch (Flojel 60, National Starch) | 15 |
| Rice Flour | 18 |
| Dextrin (National 0280) | 10 |
| Corn Syrup Solids | 0.25 |
| Xanthan Gum | 0.2 |
| Salt | 4.55 |
| SAPP | 1 |
| Soda | 0.65 |
| TOTAL DRY INGREDIENTS | 100.00 |

PenBind 190 is a cross-linked potato starch available from Penford Food Ingredients Co. of Englewood, Colo. Flojel 60 is a chemically modified ungelatinized corn starch available from National Starch and Chemical Corporation of Bridgewater, N.J. The dextrin referred to in Table 1 may comprise a tapioca dextrin also available from National Starch and Chemical Corporation under the product designation 0280.

The dry batter mix set forth in Table 1 is mixed with water to form an aqueous slurry containing about 40% of the dry mix by weight. When coated with this batter, the coated strips exhibit an approximate 20% increase by weight, wherein about 40% of the net weight increase, or about 8% of the total weight of the batter coated strips, is represented by the solids proportion of the starch based batter slurry.

The batter coated strips are next subjected to a first parfry step in hot oil for further partial cooking. This first parfry step is of relatively short duration, about 30–100 seconds, and takes place in hot oil at a temperature of about 350–395° F. A vegetable oil, such as a soy-based oil, is preferred. However, it will be recognized and understood that other cooking oils may be used such as animal oil, or combinations of vegetable and animal oils. In this regard, it will be further understood that the cooking oil may comprise any of a wide range of natural and synthetic fats or oils consisting essentially of triglycerides, as well as non-toxic fat-like materials having properties similar to triglycerides and commonly referred to as fat substitutes which may be fully or partly indigestible.

The once-parfried potato strips are removed from the hot oil and are promptly frozen as by blast freezing in a typical commercial blast freezer at about −15° F. The once-parfried batter coated potato strips are then subjected without prior thawing to a second parfry step, also of relatively short duration of about 60–330 seconds, in hot oil such as a soy-based vegetable oil at a temperature of about 290–395° F. for further partial cooking and to set the batter thereon, after which the strips are promptly frozen a second time as by blast freezing at about −15° F. The specific duration of the second parfry step generally will be inversely proportional to the specific duration of the first parfry step. The twice-parfried and twice-frozen batter coated potato strips are packaged in a normal manner for shipment and/or storage in the frozen state, awaiting finish preparation for consumption.

In the twice-parfried and twice-frozen state, the batter coated potato strips exhibit a moisture content of between about 44% to about 50% by weight. In this regard, to achieve a substantially optimized balance of product quality characteristics in the finish-prepared state, a product moisture level within this approximate 44–50% range is consistent with achieving quality crispness in a desirably short finish preparation time, without imparting attributes of toughness or development of off-flavor characteristics. For product strips having a moisture level significantly above 50%, crispness levels are adversely affected unless the finish preparation time and/or temperature is significantly and undesirably increased. For product strips having a moisture level significantly below about 44%, the finish-prepared strips tend to exhibit undesirable traits of excessive toughness, stiffness, and dryness. Moreover, such strips have a tendency to develop stale or other off-flavor characteristics during frozen storage.

For finish preparation, the twice-parfried and twice-frozen batter coated potato strips are reconstituted in an oven, such as a forced air convection oven, e.g., a double air impingement oven of the type having vertically opposed upwardly and downwardly directed jets of substantially collimated and heated air aimed toward a moving belt for transporting the potato strips through the oven. More particularly, the potato strips are placed while frozen in a relatively shallow layer, preferably having a bed depth not to exceed about one inch, directly onto the moving belt or onto a shallow tray or pan formed from a relatively high thermal heat transfer material, and exposed within the oven to the opposed heated air jets directed substantially perpendicular to the layer of strips. In an exemplary double air impingement oven, such air jets provide a relatively combined high mass flow on the order of about 1000–4000 cubic feet per minute (cfm), and preferably on the order of about 1100–2500 cfm. The potato strips are heated within the oven at a temperature of about 375–450° F. for a short finish preparation time of about 1–4 minutes (60–240 seconds), comparable to the finish preparation time for parfried and frozen potato strips reconstituted by finish frying in a fast food restaurant. Exemplary air impingement ovens of this general type are disclosed, for example, in U.S. Pat. Nos. 4,338,911 and 4,523,391. Alternative ovens are available from Middleby Cooking Systems Group of Elgin, Ill., under the product designation ReFry.

Upon removal from the oven, the reheated potato strips are promptly sprayed with a light mist of cooking oil, such as a soy-based vegetable oil of the type used in the parfry steps previously described, to impart a taste and mouth feel more closely emulating a traditional finish fried product. The strips are then salted preparatory to bagging or other appropriate handling for serving to the consumer.

For purposes of analyzing and confirming the improved qualities of the oven finished potato strips of the present invention, the strips were evaluated by a trained sensory panel for crispness attributes and to identify the proportion of strips which exhibited undesirable collapse in one or more sides of the cut strips. In this regard, a "collapsed" strip is defined as one in which at least one cut side is creased near the midline for at least half the strip length. It is believed that strip collapse occurs when the strip lacks sufficient surface structure in terms of crispness, hardness and stiffness, and the starchy strip interior is too soft to support the surface. An ideal finish prepared French fry strip exhibits a substantially square or a slightly convex or puffed cut side geometry with minimal occurrence of collapse, and wherein this shape does not change significantly during holding prior to serving. In contrast, the presence of one or more collapsed sides in a significant proportion of the finish prepared strips is less appealing visually and tends to be associated with a less crisp exterior and a less desirable interior.

The sensory panel rated the finish prepared strips by testing a random strips samples at holding times of 4 minutes and 10 minutes following removal from the finish oven. In this regard, the 4 minute time interval represents an approximate minimum product holding time before serving in a fast food restaurant, whereas the longer 10 minute holding time represents an approximate maximum holding time prior to serving in a fast food restaurant. The panel members also recorded the temperatures (serving temperature) of the strips at these holding times, wherein a higher temperature at each holding time is generally consistent with a higher quality product.

The panel consisted of five trained panel members. To assess crispness, each panel member evaluated 5 randomly selected strips at the 4 minute and also at the 10 minutes holding times. Each selected strip was tested by the panel member by shearing the strip with the front teeth and then rating the strip for crispness in terms of the resultant sound and force required to shear the strip. The crispness scale ranged from 0 (limp, equivalent to cooked green beans) to 15 (crisp, equivalent to a pretzel). An optimum crispness value for a French fry strip prepared by finish frying is generally between about 6 and 7 at the 4 minute holding time, and tends to be somewhat lower (about one full point) at the 10 minute holding time. The scores for the 5 strips analyzed at each holding time by each panelist were averaged, and then the average scores of the five panelists were averaged.

At the 4 minute holding time, French fry strips prepared in accordance with the invention, wherein the batter coated and twice-parfried strips had been finish prepared in an impingement oven with a short preparation time, exhibited a crispness score within the target range of 6–7, and a high serving temperature exceeding 170° F. At the 10 minute holding time, these same French fry strips exhibited a crispness score of greater than 5.0 and a temperature of about 150° F.

The percentage of "collapsed" strips was also determined at the 4 minute holding time, by actual count of 50 individual strips selected at random from an approximate ¾ pound product sample, wherein it is recognized that the proportion of "collapsed" strips will remain substantially the same at the subsequent 10 minute holding time. The finished prepared strips of the present invention indicated an acceptably minor proportion of collapsed strips, on the order of 6% or less.

Accordingly, the oven finished batter coated potato strips, prepared in accordance with the dual parfry and dual freeze steps of the present invention, exhibited high "crispness" and low "collapsed" scores closely emulating the same parameters for potato strips which are finish prepared by frying. That is, the oven reconstituted potato strips of the invention were judged by the sensory panel to be nearly equivalent to batter coated potato strips subjected to conventional single parfry and single freeze preprocessing steps and then reconstituted by finish frying, both in terms of crispness scores and collapsed scores at both 4 minute and 10 minute holding times. Moreover, the oven finished potato strips of the invention were judged by the sensory panel to be superior to conventional uncoated potato strips subjected to normal single parfry and freeze preprocessing and then finish prepared by frying, especially with respect to maintaining crispness characteristics for the extended 10 minute holding time.

The following examples are provided to demonstrate the invention:

EXAMPLE 1

Whole Shepody potatoes were washed, peeled and trimmed, and then cut into so-called shoestring strips having lengths ranging from about one inch to about five or six inches, with a length distribution of at least about 30% having a length exceeding three inches and not more than about 20% having a length less than two inches. These shoestring strips were cut to have cross sectional side dimensions of about 0.29–0.30 inch by about 0.29–0.30 inch. These cut potato strips were subjected to a blanching step in hot water at about 175° F., for about 3½ minutes. These blanched strips were then dipped in a water-based dip solution having a temperature of about 140° F. for about 30 seconds, wherein this dip solution included approximately 0.3% dextrose and about 3% salt. Upon removal from the dip solution, excess water was removed from the blanched potato strips by drying in warm ambient air at about 160° F. for a period of time sufficient to achieve a weight loss of about 14–15%. The potato strips were then coated with the starch based batter, comprising the ingredients set forth in Table 1 above, with the dry ingredients mixed with water and representing about 40% of the weight of the resultant starch slurry.

Following the batter coating step, the potato strips were subjected to a first parfry step in hot soy-based vegetable oil at a temperature of about 375° F. for about 40 seconds. The strips were then removed from the hot oil and frozen in a blast type freezer at a temperature of about −15° F. While in the frozen state, the batter coated and once-parfried and frozen potato strips were then conveyed without prior thawing to a second parfry step in hot soy-based vegetable oil at a temperature of about 335° F. for a time of about 140 seconds. The twice-parfried strips were then removed from the hot oil and frozen a second time in a blast type freezer at a temperature of about −15° F. The twice-parfried and twice-frozen strips were analyzed and determined to have a moisture content of about 45% by weight, and a fat content of about 11% by weight.

The twice-parfried and twice-frozen batter coated potato strips were reconstituted in a double impingement oven at 395° F. for 135 seconds. Immediately after baking, the potato strips were sprayed with a light mist of a soy-based vegetable oil in an amount of about 6% by weight. The products were then placed in a heated bagging station under an infrared lamp, typical of a fast food restaurant, and salted at a rate of about 0.4% by weight. The potato strips were then analyzed by the sensory panel at 4 minutes after the conclusion of the oven cycle, and again at 10 minutes after the conclusion of the oven cycle. Also, the percentage of "collapsed" strips was measured at the 4 minute holding time.

The sensory panel rated these oven finished batter coated potato strips with a score of 6.5 for crispness, and a serving temperature of 173° F. at the 4 minute holding time. In addition, these strips achieved a "collapsed" score of 6%. After the longer ten minute holding time, the products achieved a score of 5.2 for crispness, with a measured serving temperature of 149° F. These results are tabulated in Table 2 below, in comparison with data from potato strip samples prepared according to other preprocessing and other finish preparation methods as described further herein. In this regard, the designation "2F2F" in Table 2 indicates a product subjected to dual parfry and dual freeze steps, whereas the designation "1F1F" refers to a product which has undergone single parfry and single freeze steps.

EXAMPLE 2

Batter coated French fry potato strips were prepared in accordance with the first parfry and single freeze steps set forth in Example 1. These parfried and frozen potato strips were analyzed and determined to have a moisture content of about 60% by weight, and a fat content of about 7% by weight.

These once-parfried and once-frozen batter coated potato strips were finish prepared by frying in hot soy-based vegetable oil at a temperature of about 350° F. for a short finish preparation time of about 165 seconds. The thus-reconstituted strips were salted immediately after finish frying at a rate of about 0.4% by weight. These finish fried batter coated strips were presented to the sensory panel at the 4 minute and 10 minute holding times.

The sensory panel scored these finish fried and batter coated products with a score of 6.1 for crispness at the 4 minute holding time, with a serving temperature of 167° F. However, these once-parfried and once-frozen strips rated an undesirable "collapsed" proportion of 24%. At the 10 minute holding time, the panel rated these potato strips with a score of 5.9 for crispness, with a serving temperature of 139° F.

Accordingly, the data indicates that the twice-parfried and twice-frozen batter coated strips of Example 1, finish prepared in an oven, exhibited superior crispness and a higher serving temperature at the 4 minute holding time, and also exhibited significantly fewer "collapsed" strips in comparison with the once-parfied and once-frozen batter coated strips of Example 2 which were finish prepared by conventional frying in hot oil. At the 10 minute holding time, the oven-finished strips of Example 1 evidenced a nearly comparable but somewhat lower crispness score, in combination with a significantly higher serving temperature. On the whole, and especially considering the dramatically better "collapsed" score, the oven-finished strips of Example I rated significantly better than the finish fried strips of Example 2.

EXAMPLE 3

Batter coated potato strips were prepared and preprocessed by blanching, batter coating, parfrying a single time and then promptly frozen as described in Example 1, except that the duration of the single fry step was extended to reduce the moisture level of the frozen parfried strips to a moisture level comparable to the twice-parfried and frozen strips of Example 1. In this regard, the single parfry step was performed at a temperature of about 335° F. for a time period of about 240 seconds. This combination of extended fry dwell time and reduced oil temperature was required to achieve the desired higher moisture reduction during the parfry step without excessive browning. These potato strips were promptly frozen as described in Example 1 and then analyzed and determined to have a moisture content of about 47% by weight, and a fat content of about 10% by weight.

These once-parfried and once-frozen batter coated strips were finish prepared in the double impingement oven as described in Example 1 at a temperature of about 395° F. for a short preparation time of about 135 seconds. The reconstituted strips were misted with a light coating of oil and salted immediately after frying, as described in Example 1. These oven-finished batter coated strips were presented to the sensory panel at the 4 and 10 minute holding times. "Collapsed" strips were counted at the 4 minute holding time.

The sensory panel rated these oven-finished batter coated strips with a score of 5.5 for crispness, and the serving temperature was 165° F. The number of "collapsed" strips was extremely high, namely, about 86%. At the 10 minute holding period, these strips rated a low score of 3.9 for crispness, with a serving temperature of 137° F.

Accordingly, the data indicates that the twice-parfied and twice-frozen coated strips, reconstituted in an oven per Example 1, rated substantially better than the once-parfried and frozen coated strips of comparable moisture level, which were also finish prepared in an oven pursuant to Example 3.

EXAMPLE 4

Uncoated French fry potato strips were prepared and preprocessed in accordance with Example 1, except that the potato strips were not coated with the starch based batter. More specifically, the cut potato strips were blanched, dipped in the salt and dextrose solution, and then dried according to Example 1. These potato strips were then parfried a first time in hot soy-based vegetable oil at about 375° F. for about 50 seconds and then blast frozen as previously described. The potato strips were then parfried a second time in hot oil at about 335° F. for about 140 seconds followed by blast freezing a second time. These twice-parfried and twice-frozen potato strips, without batter coating, were analyzed and determined to have a moisture content of about 47% by weight and a fat content of about 12% by weight. The dwell time of the first parfry step was increased slightly compared to the batter coated product of Example 1, in order to reduce the moisture level of the twice-parfried and frozen strips to a level comparable to Example 1. In this regard, the increased overall solids content of the strips of Example 1, attributable in part to the solids proportion of the batter coating, results in a slightly lower moisture content in Example 1 with a slightly shorter fry time.

These twice-parfried and twice-frozen strips, without batter coating, were finish prepared in the same impingement oven used in Example 1, with the same finish preparation time and temperature, followed immediately by the same oil spray and salt addition. The finish prepared strips were presented to the sensory panel at the 4 and 10 minute holding times, and the percentage of "collapsed" strips was counted at the 4 minute holding time.

The sensory panel rated these oven-finished uncoated strips at the 4 minute holding time with a score of 3.7 for crispness, and a serving temperature of 169° F. The percentage of "collapsed" strips was again undesirably high, at about 44%. At the 10 minute holding period, these strips rated a score of 3.7 for crispness, with a serving temperature of 146° F.

Accordingly, the data indicates that the twice-parfied and twice-frozen batter coated strips, reconstituted in an oven per Example 1, rated significantly better than the twice-parfried and twice-frozen but uncoated strips which were finish prepared according to the same short-time oven preparation steps.

EXAMPLE 5

Uncoated French fry potato strips were prepared and preprocessed with a single parfry step and a single freeze step as described in Example 1, through the first parfry and freeze steps. These potato strips were analyzed and determined to have a moisture content of about 64% by weight and a fat content of about 6% by weight.

These once-parfried and once-frozen but uncoated potato strips were finish prepared by frying in hot soy-based vegetable oil and then salted according to the steps described in Example 2. These finish-fried strips were presented to the sensory panel at the 4 minute and 10 minute holding times, and the number of "collapsed" strips was determined at the 4 minute holding time.

The sensory panel rated these finish-fry reconstituted but uncoated strips with a score of 4.3 for crispness, and a serving temperature of 168° F. at the 4 minute holding time. A large percentage, namely, about 56%, of the strips were "collapsed". At the ten minute holding period, these strips rated a score of 3.6 for crispness, with a serving temperature of 136° F.

Accordingly, the data indicates that the twice-parfied and twice-frozen coated strips, reconstituted in an oven per Example 1, rated superior to the once-parfried and once-frozen but uncoated strips which were finish prepared in hot oil pursuant to Example 5. In this regard, the oven-finished strips of Example 1 scored dramatically better in the crispness category than the finish-fried uncoated strips of Example 5.

EXAMPLE 6

Once-parfried and frozen uncoated potato strips were also preprocessed in accordance with Example 1, with the duration of the single parfry step again being extended to reduce the moisture content of the frozen strips to a level comparable to the twice-parfried and twice-frozen strips of Example 1. More particularly, uncoated potato strips were prepared according to Example 1, but wherein the strips were parfried in hot oil at a temperature of about 335° F. for an extended parfry time of about 275 seconds. These potato strips were then promptly frozen as described in Example 1. The once-parfried and once-frozen strips were analyzed and determined to have a moisture content of about 49% by weight, and a fat content of about 9% by weight.

These once-parfried and frozen uncoated strips were then finish prepared in the double impingement oven at the time and temperature conditions described in Example 1, followed by spraying with the light coating of vegetable oil and salting per Example 1. These oven finished strips were presented to the sensory panel at the 4 and 10 minute holding times, and the "collapsed" strips were counted at the 4 minute holding time.

The sensory panel rated these oven reconstituted uncoated strips with a score of 3.2 for crispness, and a serving temperature of 161° F. at the 4 minute holding time. The number of "collapsed" strips was about 90%. At the 10 minute holding period, these strips again rated a score of 3.2 for crispness, with a serving temperature of 134° F.

Accordingly, the data indicates that the twice-parfied and twice-frozen coated strips, reconstituted in an oven per Example 1, rated significantly better than the once-parfried and frozen uncoated strips which were preprocessed to a lower and comparable moisture level in the frozen state and thereafter finish prepared by oven heating in the same manner per Example 6.

The data set forth in Examples 1–6 presented below in Table 2, wherein "2F2F" indicates a product subjected to dual parfry and freeze steps, whereas "1F2F" indicates a product preprocessed with a single parfry and freeze step.

particularly, the following Examples 7–12 were prepared using potato strips and process steps corresponding respectively with those described above in Examples 1–6, except that a modified batter formulation was used as set forth in the following Table 3:

TABLE 3

| BATTER #2 | % of Dry Mix |
|---|---|
| Potato Starch (Penbind 190) | 41.5 |
| Potato Starch (Penbind 195) | 8 |
| Dextrin (PenCling 720) | 12 |
| Pregelatinized Starch (PenPlus 40) | 1.5 |
| Cerestar AmyloGel 03003 | 6 |
| Cerestar BatterCrisp 90230 | 6 |
| Rice Flour | 20 |
| Xanthan Gum | 0.1 |
| Salt | 3 |
| SAPP | 0.95 |
| Soda | 0.95 |
| TOTAL DRY INGREDIENTS | 100.00 |

Pen Bind 190 and PenBind 195 are cross-linked potato starches available from Penford Food Ingredients Co. of

TABLE 2

| EX # | TYPE | PREP METH | PREP TIME (SEC) | % MOIST | % FAT | HOLD TIME (MIN) | % COLL | CRISP | SERV TEMP (° F.) |
|---|---|---|---|---|---|---|---|---|---|
| 1. | Coated 2F2F | oven | 135 | 45 | 11 | 4 | 6 | 6.5 | 173 |
|   |   |   |   |   |   | 10 |   | 5.2 | 149 |
| 2. | Coated 1F1F | fried | 165 | 60 | 7 | 4 | 24 | 6.1 | 167 |
|   |   |   |   |   |   | 10 |   | 5.9 | 139 |
| 3. | Coated 1F1F | oven | 135 | 47 | 10 | 4 | 86 | 5.5 | 165 |
|   |   |   |   |   |   | 10 |   | 3.9 | 137 |
| 4. | Uncoat 2F2F | oven | 135 | 47 | 12 | 4 | 44 | 3.7 | 169 |
|   |   |   |   |   |   | 10 |   | 3.2 | 146 |
| 5. | Uncoat 1F1F | fried | 165 | 64 | 6 | 4 | 56 | 4.3 | 168 |
|   |   |   |   |   |   | 10 |   | 3.6 | 136 |
| 6. | Uncoat 1F1F | oven | 135 | 49 | 9 | 4 | 90 | 3.2 | 161 |
|   |   |   |   |   |   | 10 |   | 3.2 | 134 |

The foregoing examples illustrate that the twice-parfried and twice-frozen potato strips in accordance with the present invention (Example 1) are capable of reconstitution or finish preparation in an oven with an overall set of crispness and quality characteristics which closely correspond to the characteristics of traditional French fry potato strips which have been finish prepared by frying (e.g., Example 2). Moreover, the data reveals that the potato strips of the present invention can be oven reconstituted in a short finish preparation time similar to that utilized with traditional finish-fried French fry potato strips. The twice-parfried and twice-frozen strips of the invention are also superior when oven reconstituted to counterpart potato strips which have been subjected to a single parfry and freeze step during preprocessing.

A further series of examples were prepared and analyzed according to the foregoing Examples 1–6, with the exception that a different batter formulation was used. More Englewood, Colo., wherein PenBind 195 potato starch has a comparatively higher degree of cross-linking and a resultant comparatively lower viscosity when prepared in a batter-type slurry. PenPlus 40 is a cross-linked pregelatinized modified potato starch, and PenCling 720 is a low solubility potato dextrin—both also available from Penford Food Ingredients Co. Cerestar AmyloGel 03003 is an unmodified high amylose corn starch, and Cerestar BatterCrisp 90230 is a modified and acetylated high amylose corn starch—both available from Cerestar USA, Inc. of Hammond, Ind.

Each of the Examples 7–12 was presented to the sensory panel at the same 4 minute and 10 minute holding times after finish preparation. Table 4 below sets forth the results:

TABLE 4

| EX # | TYPE | PREP METH | PREP TIME (SEC) | % MOIST | % FAT | HOLD TIME (MIN) | % COLL | CRISP | SERV TEMP (° F.) |
|---|---|---|---|---|---|---|---|---|---|
| 7. | Coated 2F2F | oven | 135 | 48 | 11 | 4 | 4 | 6.3 | 180 |
|  |  |  |  |  |  | 10 |  | 5.8 | 151 |
| 8. | Coated 1F1F | fried | 165 | 61 | 7 | 4 | 0 | 7.3 | 172 |
|  |  |  |  |  |  | 10 |  | 6.4 | 142 |
| 9. | Coated 1F1F | oven | 135 | 44 | 9 | 4 | 72 | 6.0 | 173 |
|  |  |  |  |  |  | 10 |  | 5.5 | 149 |
| 10. | Uncoat 2F2F | oven | 135 | 49 | 12 | 4 | 8 | 4.7 | 169 |
|  |  |  |  |  |  | 10 |  | 3.8 | 141 |
| 11. | Uncoat 1F1F | fried | 165 | 65 | 6 | 4 | 0 | 5.2 | 163 |
|  |  |  |  |  |  | 10 |  | 4.0 | 135 |
| 12. | Uncoat 1F1F | oven | 135 | 50 | 9 | 4 | 96 | 3.9 | 165 |
|  |  |  |  |  |  | 10 |  | 3.5 | 130 |

Once again, for the series of Examples 7–12 using the modified starch slurry batter of Table 3, the data indicates that the twice-parfried and twice-frozen batter coated strips of Example 7 exhibit crispness and serving temperature characteristics comparable to a batter coated product which has been finish prepared by conventional frying in hot oil (e.g., Example 8). The proportion of "collapsed" strips per the invention (Ex. 7) is also comparable to the ideal finish prepared French fry (e.g., Ex. 8). Moreover, the oven finished strips of the present invention rated superior in crispness to uncoated strips which were finish prepared by frying or in an oven (e.g., Examples 10–12).

Various modifications and improvements to the invention described herein will be apparent to persons skilled in the art. For example, persons skilled in the art will readily recognize and appreciate that the process of the present invention can be applied to different potato strip cut sizes, with appropriate adjustment in the blanch and parfry processing conditions to accommodate larger or small cut potato strips. Accordingly, no limitation on the invention is intended by way of the foregoing description, except as set forth in the appended claims.

What is claimed is:

1. A process for parfrying and freezing potato strips capable of subsequent finish preparation by oven heating, said process comprising the steps of:
   blanching the potato strips;
   coating the potato strips with a starch-based aqueous slurry having a solids proportion of about 40% by weight;
   parfrying the coated potato strips a first time in hot oil;
   promptly freezing the once-parfried potato strips;
   parfrying the once-parfried and once-frozen potato strips a second time in hot oil; and
   promptly freezing the twice-parfried and twice-frozen potato strips;
   said twice-parfried and twice-frozen potato strips having a moisture content of about 44% to about 50% by weight.

2. The process of claim 1 further including the step of finish preparing the twice-parfried and twice-frozen potato strips by heating in an oven at a temperature range of about 375–450° F., and for a finish preparation time of less than about 4 minutes.

3. The process of claim 2 wherein said finish preparation step comprises heating the potato strips in an air impingement oven.

4. The process of claim 1 further including the step of finish preparing the twice-parfried and twice-frozen potato strips by heating in an oven at a temperature range of about 395–420°F., and for a finish preparation time of less than about 4 minutes.

5. The process of claim 4 said finish preparation time is less than about 3 minutes.

6. The process of claim 4 wherein said finish preparation time is about 2¼ to about 2½ minutes.

7. The process of claim 1 wherein said blanching step comprises blanching the potato strips in hot water or steam at a temperature of about 155–200° F. for a time period of about 2–15 minutes.

8. The process of claim 7 wherein said blanching step comprises blanching the potato strips in hot water at a temperature of about 175° F. for a time period of about three and one-half minutes.

9. The process of claim 7 further including the step of partially drying the potato strips following said blanching step and preceding said coating step, to partially reduce the weight of the blanched potato strips.

10. The process of claim 9 wherein said partially drying step comprises removing excess water from the blanched potato strips to reduce the weight thereof by about 15%.

11. The process of claim 1 wherein said first parfry step comprises parfrying the potato strips in hot oil at a temperature of about 350–395° F. for a time period of about 30–100 seconds.

12. The process of claim 11 wherein said first parfry step comprises parfrying the potato strips in hot oil at a temperature of about 375° F. for a time period of about 40 seconds.

13. The process of claim 1 wherein each of said freezing steps comprises blast freezing the potato strips at a temperature of about −15° F.

14. The process of claim 1 wherein the coated potato strips exhibit an increase of about 20% by weight prior to said first parfrying step.

15. A process for parfrying and freezing potato strips capable of subsequent finish preparation by oven heating, said process comprising the steps of:
   blanching the potato strips;
   coating the potato strips with a starch-based aqueous slurry having a solids proportion of about 40% by weight and adapted to provide a batter coating which is substantially clear upon finish preparation of the potato strips;

parfrying the coated potato strips a first time in hot oil;

promptly freezing the once-parfried potato strips;

parfrying the once-parfried and once-frozen potato strips a second time in hot oil, said second parfrying step occurring without prior thawing of the potato strips; and promptly freezing the twice-parfried and twice-frozen potato strips;

said twice-parfried and twice-frozen potato strips having a moisture content of about 44% to about 50% by weight.

16. The process of claim 15 further including the step of finish preparing the twice-parfried and twice-frozen potato strips by heating in an oven at a temperature range of about 375–450° F., and for a finish preparation time of less than about 4 minutes.

17. The process of claim 16 wherein said finish preparation step comprises heating the potato strips in an air impingement oven.

18. The process of claim 15 further including the step of finish preparing the twice-parfried and twice-frozen potato strips by heating in an oven at a temperature range of about 395–420° F., and for a finish preparation time of less than about 4 minutes.

19. The process of claim 18 wherein said finish preparation time is less than about 3 minutes.

20. The process of claim 18 wherein said finish preparation time is about 2¼ to about 2½ minutes.

21. The process of claim 15 wherein said blanching step comprises blanching the potato strips in hot water or steam at a temperature of about 155–200° F. for a time period of about 2–15 minutes.

22. The process of claim 21 further including the step of partially drying the potato strips following said blanching step and preceding said coating step, to partially reduce the weight of the blanched potato strips.

23. The process of claim 22 wherein said partially drying step comprises removing excess water from the blanched potato strips to reduce the weight thereof by about 15%.

24. The process of claim 15 wherein said first parfry step comprises parfrying the potato strips in hot oil at a temperature of about 350–395° F. for a time period of about 60–330 seconds.

25. The process of claim 15 wherein the coated potato strips exhibit an increase of about 20% by weight prior to said first parfrying step.

26. A process for parfrying and freezing potato strips capable of subsequent finish preparation by oven heating, said process comprising the steps of:

blanching the potato strips;

coating the potato strips with a starch-based aqueous slurry having a solids proportion of about 40% by weight to produce coated potato strips exhibiting an increase by weight of about 8% attributable to the solids proportion of the starch-based aqueous slurry;

parfrying the coated potato strips a first time in hot oil;

promptly freezing the once-parfried potato strips;

parfrying the once-parfried and once-frozen potato strips a second time in hot oil; and promptly freezing the twice-parfried and twice-frozen potato strips;

said twice-parfried and twice-frozen potato strips having a moisture content of about 44% to about 50% by weight.

* * * * *